Oct. 30, 1973

M. A. BAKER ET AL

Re. 27,805

SELF-DAMPING CABLE

Original Filed Sept. 8, 1970

INVENTORS
Mark A. Baker &
Charles B. Rawlins
BY E. Strickland
ATTORNEY

United States Patent Office

Re. 27,805
Reissued Oct. 30, 1973

27,805
SELF-DAMPING CABLE

Mark A. Baker, Potsdam, and Charles B. Rawlins, Massena, N.Y., assignors to Aluminum Company of America, Pittsburgh, Pa.

Original No. 3,619,480, dated Nov. 9, 1971, Ser. No. 70,395, Sept. 8, 1970. Application for reissue Mar. 13, 1972, Ser. No. 234,421
Int. Cl. H01b *5/00;* H02g *7/14*
U.S. Cl. 174—130 6 Claims

Matter enclosed in heavy brackets [ ] appears in the original patent but forms no part of this reissue specification; matter printed in italics indicates the additions made by reissue.

ABSTRACT OF THE DISCLOSURE

A self-damping electrical conductor for suspension between spaced supports, the conductor including a hollow conductive mantle and a conductive core loosely disposed therein. The conductive core comprises at least two substantially straight conductors extending through the mantle in essentially parallel relationship to the longitudinal axis thereof, and loosely disposed with respect to each other and to the mantle. The conductive mantle and the core conductors have several different combinations of stress-strain characteristics, density, and coefficient of thermal expansion, such that the core conductors inherently seek different sags when the mantle and core are suspended under tension between supports.

BACKGROUND OF THE INVENTION

The present invention relates generally to electrical cables or conductors, for example, of the type employed in overhead transmission lines, and particularly to an improved electrical conductor capable of damping itself when subjected to wind induced vibrations.

As is well known in the art, cables and conductors that are supported between poles or towers are subjected to air currents moving across the cables which currents tend to move and vibrate the cable. If the period of vibration cause by the air currents moving across a cable coincides with the natural period (or harmonic thereof) of the cable, is then subjected to a sustained mechanical vibration or oscillation which causes a continuous bending moment of the cable at its support locations. Such bend of *a* cable fatigues the metal thereof with consequent eventual failure of the cable at one or more of the support locations.

A prior, early cable construction designed to provide a high order of damping, and one which the present invention is an improvement thereon, consisted essentially of a single core conductor of stranded wires disposed in a hollow conductive mantle, the internal diameter of the mantle being larger than the external diameter of the core so that an annular clearance was provided between them.

The cable was suspended between poles or towers with different tensions, or tension to weight ratios, imposed upon the core and mantle. The difference in tensions or tension to weight ratios caused the core and mantle to seek different sags.

The sag that each would have, without the constraint of the other, is called herein its inherent sag. Due to the fact that they are nested, the core and mantle are obliged to share a common sag, desirably different from either of the inherent sags.

When such a cable is vibrated by air currents moving across it, the core and mantle are subject to relative, lateral movement, i.e. movement in a direction substantially perpendicular to the longitudinal axis of the cable. The relative, lateral movement of the core and mantle resulted in the core and mantle physically impacting against each other to dissipate the energy of the vibration in the form of heat, and thus provided the cable with its self-damping capabilities. The difference in inherent sags causes the core and mantle to be pressed or urged together, so that, when the above relative lateral movements cause them to impact, the violence of the impacts is increased, thus enhancing energy dissipation and damping.

This early cable had two basic disadvantages, namely, it had a substantial acceleration threshold that had to be exceeded before the core and mantle separated to effect damping by core-mantle impacts, and special, costly tensioning procedures were required to cause the core and mantle to seek different inherent sags. The first disadvantage is overcome by the invention described in U.S. application Ser. No. 865,306 filed in Oct. 10, 1969 (now Pat. No. 3,553,350 in the name of C. B. Rawlins, one of the present inventors. The second disadvantage is overcome by the present invention.

As explained above, the core and mantle of the early cable had to have different tensions or tension to weight ratios in order to provide different sag seeking tendencies therefor and thus effective damping. This was accomplished by separate tensioning of the core and mantle. However, even with the separate tensioning of the core and mantle it is possible for the core and mantle to seek the same sag at certain temperatures. As is well known, metals expand and contract with respective increases and decreases in temperature, which in a conductor fixed at its locations of support, results in changes in the sag of the conductor between the supports. A sag-versus-temperature curve can be plotted for a given conductor, the position and slope of the curve depending upon the coefficient of thermal expansion, stress-strain characteristics and the density of the material of the conductor.

If the mantle and core are made respectively of aluminum and steel, which is a common practice for self-damping conductors, the slopes of the inherent sag-versus-temperature curves for aluminum and steel are not equal because of the difference in their stress-strain characteristics, coefficients of thermal expansion, and densities. At a certain temperature, the curves cross, i.e. the inherent sags of the aluminum and steel are the same and thus the damping capability of the conductor is substantially reduced.

As can be appreciated, separate tensioning of the core and mantle requires additional time and labor. A substantially simpler and more economical process would be involved if the core and mantle of self-damping conductors could be strung in the manner of *a* single unitary conductor, the appropriate division of tension between core and mantle taking place automatically in the stringing process. However, in addition to the costs involved in tensioning the early cable, there remained the possibility that the core and mantle thereof would seek the same inherent sag at a certain temperature as explained above.

BRIEF SUMMARY OF THE INVENTION

The present invention is directed to a conductor having core-mantle structures which inherently seek different sags for all temperature conditions when suspended between spaced supports. This is accomplished with a hollow conductive mantle containing at least two loosely disposed conductive cores, or groups of cores, extending parallel to the longitudinal axis of the mantle, and having combinations of stress-strain characteristics, density, and coefficient of thermal expansion different from each other and different from the mantle. By virtue of their loose parallel disposition within the mantle and the different combinations of stress-strain characteristics, density, and coefficient of expansion when the conductor is suspended between spaced supports, the cores, or groups of cores, and mantle will inherently seek different sags for all temperatures, i.e., there is no temperature at which all three components will seek the same inherent sag. This is achieved by the choice of combinations of stress-strain characteristics, density, coefficient of thermal expansion for each component.

In this manner, a high order of damping for the conductor under all the temperature conditions is insured, and since the cores and mantle inherently seek different sags when suspended, the cost of separately tensioning the cores and mantle is eliminated.

In addition to the economies effected by the conductor of the present invention regarding tensioning, by using loose, parallel wires as the core, i.e., wires that are unstranded, the cost of stranding the core wires is eliminated thereby increasing the savings associated with the cable construction of the invention.

Further, with two or more loosely disposed conductive cores within the mantle, increased damping capabilities are available by virtue of the increase in impact possibilities. With two or more core conductors, the core conductors can impact against each other as well as with the mantle which heretofore has been unavailable with a single core self-damping cable.

Thus, with the present invention, the economies effected in tensioning procedures and in the use of unstranded core wires are available in a cable having a separate core and mantle while simultaneously providing enhanced damping capabilities by insuring different inherent sag tendencies of the conductor components and allowing physical impact between core conductors as well as impact between core conductors as well as impact between the mantle and the core conductors with vibration of the cable.

THE DRAWING

The invention, along with its advantages and objectives, will be more fully understood from the following detailed description taken in connection with the accompanying drawing in which.

PREFERRED EMBODIMENTS

Figure 1:
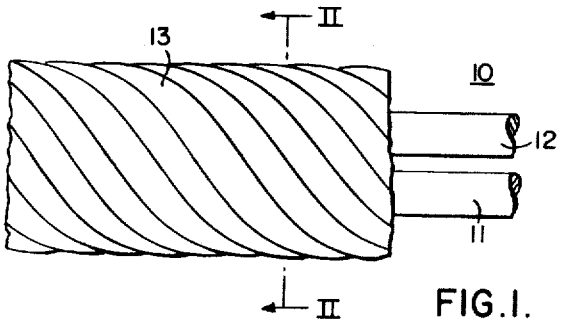
FIG. 1 is a side elevation view of a portion of a self-damping electrical conductor constructed in acordance with the principles of the present invention.
Figure 2:
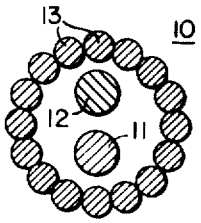
FIG. 2 is a cross-sectional view of the conductor of FIG. 1 taken along lines II—II.

Specifically, FIGS. 1 and 2 show an embodiment of the invention in which an improved self-damping cable 10 is provided by using at least two core conductors 11 and 12 loosely disposed in the hollow of a surrounding conductive mantle 13, the core conductors being essentially straight and extending substantially parallel to the longitundinal axis of the mantle, and the two core conductors and the mantle each having different sag characteristics. The difference in sag characteristics can be provided by using metals having different densities, stress-strain characteristics, or coefficients of thermal expansion. The different in stress-strain characteristics can be obtained by using a combination of stranded and straight wire conductors thereby taking advantage of the difference in stress-strain characteristics of a stranded conductor in comparison to that of a straight wire conductor of the same material.

Thus in FIG. 1, the mantle 13 is shown as a stranded conductor while the two core conductors 11 and 12 are straight wires. If the two core conductors are made of different materials, then the three conductors will have three different stress-strain characteristics.

With the core conductors 11 and 12 being loosely located within the mantle 13, and with all three of the conductors having different stress-strain characteristics (and different densities if dissimilar metals are used), the three conductors will seek different inherent sags when suspended between supporting structures, and there are no temperatures at which all three would tend to seek the same inherent sag. For this reason, the conductor 10 of the present invention can be tensioned using standard tensioning procedures, i.e., a finite length of the conductor 10 is tensioned by fixing one end of the core and mantle conductors and then gripping the other end of the core and mantle, and pulling the same simultaneously until a suitable sag and tension is assumed by the conductor. No separate tensioning of the core and mantle is required as is the case with the prior, single core conductor described above.

Figure 3:
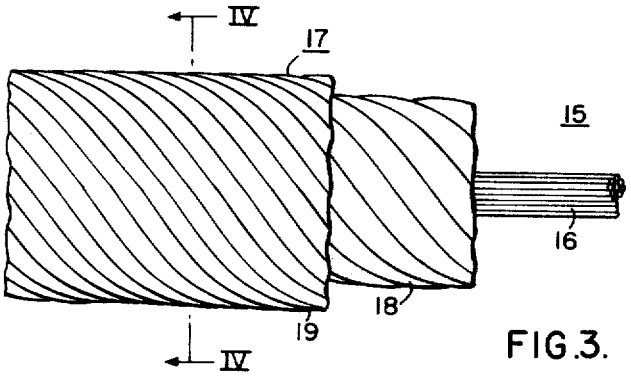
FIG. 3 is a partial side elevation view of a second embodiment of the invention.
Figure 4:
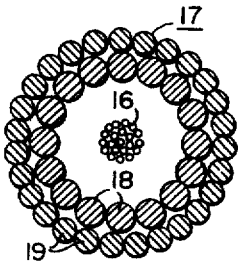
FIG. 4 is a cross-sectional view taken along line IV—IV of FIG. 3.

In FIGS. 3 and 4, a preferred embodiment of the invention is shown in which an improved self-damping cable 15 is provided by using a loose bundle of substantially straight wires 16 as a core conductor within an outer mantle 17. The mantle preferably comprises inner and outer layers of stranded wires 18 and 19 respectively though more than two layers could be used or a single layer of wires could function as the mantle as shown in FIGS. 1 and 2.

The core wires 16 are loosely disposed within the mantle and are loosely disposed with respect to each other though they are shown bunched together in FIGS. 3 and 3 for purposes of illustration. Like the parallel conductors depicted in FIGS. 1 and 2, the wires 16 are essentially straight and extend in a direction essentially parallel to the longitudinal axis of the mantle 17.

In order to insure that the mantle 17 and a portion of the core wires 16 will tend to seek different inherent sags when the conductor 15 is suspended and tensioned on spaced supports, at least one and preferably approximately one-half of the core wires are made of a metal having a different combination of stress-strain characteristics, coefficient of thermal expansion, and density than the remainder of the core wires. Thus, the core 16 comprises two groups of wires which, when tensioned, will exhibit different sag characteristics. For this reason, the conductor 15 can be tensioned in the economical manner described above in connection with conductor 10.

In addition to the economies provided in tensioning the conductors of the present invention, by using loose, unstranded core conductors, further economies are effected since stranding operations require the time and utilization of men and machines.

Stranded core conductors, however, can be used to practice the invention providing the conductor mantle and at least two of the core conductors have different sag characteristics. Thus, in FIG. 5, the combination of a straight wire conductor 21 and a stranded wire conductor 22 are used to provide a core within a hollow stranded mantle 23 for a self-damping conductor. The three conductor parts will each have a different sage characteristic if the stranded wire conductor 22 and the stranded mantle 23 are made of different materials. The straight wire conductor 21 could be the same material as the conductor 22 or 23 and still have a different stage characteristic, since, as explained above, stranded conductors have stress-strain characteristics different from that of a straight wire conductor of the same material.

Figure 5:
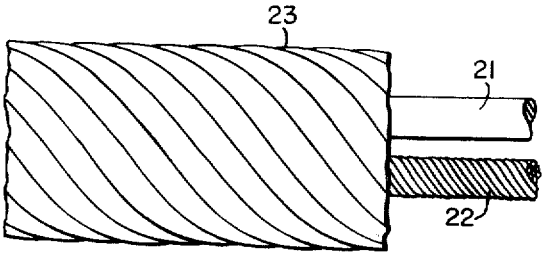
FIG. 5 is a partial side elevation view of a third embodiment of the invention.

In a similar manner, both of the core conductors in FIG. 5 could be stranded, the difference in stress-strain characteristics for the two being provided by the use of different materials for the conductors, or the use of different lay lengths in the strands of the conductors.

A typical self-damping conductor construction utilizing the principles of the invention may include as a mantle structure, an outer stranded layer comprised of 24 strands of round, 0.1786-inch diameter wires made of high conductivity EC aluminum, and an inner stranded layer of 12 round wires of 0.250-inch diameter made of 6201 aluminum alloy, a high strength alloy. With the inner and outer layers being suitably stranded, the outside diameter of the mantle, mantle 17 in FIGS. 3 and 4 for example, would be on the order of 1.6 inches in diameter, while the inner diameter of the inner lay in FIGS. 3 and 4 would be approximately 0.75 inch.

A suitable core for such a mantle may include a loose bundle of nineteen relatively straight wires with each of the wires having a diameter of 0.130 inch. If the wires were bunched in an orderly fashion as illustrated in FIGS. 3 and 4, the outer diameter of the core could be about 0.650 inch and thus about 0.100 less than the inside diameter of the mantle. Such a core is provided with at least two different sag characteristics by choosing at least two wire materials each having different combinations of stress-strain characteristics, densities, and coefficients of thermal expansion, for example, as would be provided by a combination of steel and aluminum alloy wires though the invention is not limited thereto.

From the foregoing description it should now be apparent that a new and useful self-damping conductor has been disclosed which allows the core and mantle thereof to inherently seek different sags, and thus insure a high order of damping when the conductor is subject to wind induced vibrations, when the conductor is suspended between spaced supports. No special, separate tensioning of the core and mantle is required, thereby providing substanial economies in the process of stringing the conductor. This is accomplished by using at least two, and preferably more than two, core conductors loosely disposed within the mantle, and extending generally parallel to the longitudinal axis of the mantle. The material and/or construction of the mantle and core conductors, or groups of core conductors, are such that at least three of the conductors, or groups of conductors, have different sage characteristics when suspended between supports.

While the invention has been described in terms of preferred embodiments, the claims appended hereto are intended to encompass all embodiments which fall within the spirit of the invention.

Having thus described our invention and certain embodiments thereof, we claim:

[1. A self-damping electrical conductor for suspension from spaced supports, the conductor comprising a hollow mantle conductor and a core structure comprising at least two substantially straight conductors, loosely disposed in said mantle, and extending in a direction substantially parallel to the longitudinal axis of said mantle, said mantle and core conductors having a combination of stress-strain characteristics, density, and a thermal coefficient of expansion such that all temperatures at least a first one of said core conductors tends to seek a sag different from a second one thereof and the sags of both of said first and second core conductors being different from that of said mantle.]

[2. The conductor of claim 1 in which the different stress-strain characteristics of the mantle and core conductors are provided by different mantle and core constructions.]

[3. The conductor of claim 1 in which the mantle conductor is a stranded wire construction, and the core conductors are round, loose wires, the mantle and each of said round wires each having a different combination of stress-strain characteristics, density, and coefficient of thermal expansion.]

[4. The conductor of claim 1 in which the mantle and core conductors are each made of a material having a different combination of stress-strain characteristics, density, and coefficient of thermal expansion.]

[5. The conductor of claim 1 in which the core comprises a plurality of wires, one portion of which has a stress-strain characteristic different from the remaining portion, and the stress-strain characteristics of both portions being different from that of the mantle.]

[6. The conductor described in claim 1 in which core conductors include at least one straight wire conductor and at least one conductor comprised of a plurality of wires stranded together.]

*7. A self-damping electrical conductor for suspension from spaced supports, the conductor comprising*

*a hollow mantle conductor and a core structure comprising at least two substantially straight conductors loosely disposed in said mantle and extending in a direction substantially parallel to the longitudinal axis of said mantle,*

*said mantle and core conductors each having a combination of a stress-strain characteristic, density, and thermal coefficient of expansion different from that of each other of said conductors such that at all temperatures at least one of said mantle and core conductors seeks a sag different from tht of the other of said conductors.*

*8. The conductor of claim 7 in which the different stress-strain characteristics of the mantle and core conductors are provided by different mantle and core constructions.*

*9. The conductor of claim 7 in which the mantle conductor is a stranded wire construction, and the core conductors are round, loose wires, the mantle and each of said round wires each having a different combination of a stress-strain characteristic, density, and coefficient of thermal expansion.*

*10. The conductor of claim 7 in which the mantle and core conductors are each made of a material having a different combination of a stress-strain characteristic, density, and coefficient of thermal expansion.*

*11. The conductor of claim 7 in which the core comprises a plurality of wires, one portion of which has a stress-strain characteristic different from the remaining portion, and the stress-strain characteristics of both portions being different from that of the mantle.*

*12. The conductor described in claim 7 in which the core conductors include at least one straight wire conductor and at least one conductor comprised of a plurality of wires stranded together.*

References Cited

The following references, cited by the Examiner, are of record in the patented file of this patent or the original patent.

UNITED STATES PATENTS

| | | | |
|---|---|---|---|
| 3,378,631 | 4/1968 | Edwards | 174—130 |
| 3,445,586 | 5/1969 | Edwards et al. | 174—130 |
| 3,496,285 | 2/1970 | Slethei | 174—130 |
| 3,553,350 | 1/1971 | Rawlins | 174—130 |

FOREIGN PATENTS

| | | | |
|---|---|---|---|
| 392,076 | 3/1924 | Germany | 174—127 |

LARAMIE E. ASKIN, Primary Examiner

U.S. Cl. X.R.

174—42

UNITED STATES PATENT OFFICE

CERTIFICATE OF CORRECTION

Patent No. Reissue 27,805 Dated October 30, 1973

Inventor(s) Mark A. Baker and Charles B. Rawlins

It is certified that error appears in the above-identified patent and that said Letters Patent are hereby corrected as shown below:

| | |
|---|---|
| Col. 1, line 46 | Change "bend" to --bending--. |
| Col. 1, line 47 | Change "a" to --the--. |
| Col. 3, line 5 | After "," (second occurrence) insert --and--. |
| Col. 3, line 42 | Change "acordance" to --accordance--. |
| Col. 3, lines 59 and 60 | Change "longitundinal" to --longitudinal--. |
| Col. 4, line 30 | Change "Figs. 3 and 3" to --Figs. 3 and 4--. |
| Col. 4, line 57 | Change "sage" to --sag--. |
| Col. 4, line 61 | Change "stage" to --sag--. |
| Col. 5, line 35 | Change "sage" to --sag--. |
| Claim 1, line 10 | After "that" insert --at--. |
| Claim 7, line 13 | Change "tht" to --that--. |

Signed and sealed this 13th day of August 1974.

(SEAL)
Attest:

McCOY M. GIBSON, JR.
Attesting Officer

C. MARSHALL DANN
Commissioner of Patents